April 25, 1950  D. D. GRIEG  2,504,976
ELECTRONIC PULSE DISCRIMINATOR CIRCUIT
Filed Nov. 30, 1945  4 Sheets-Sheet 2

INVENTOR.
DONALD D. GRIEG

BY *Percy P. Lantry*

ATTORNEY

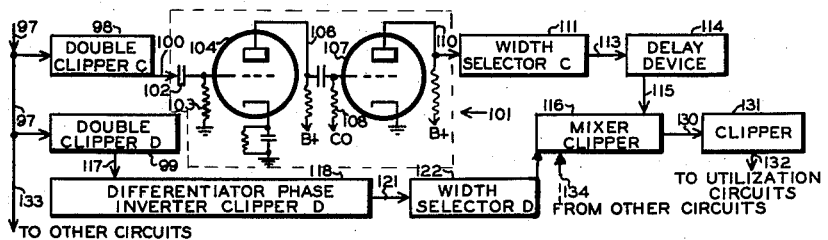

Patented Apr. 25, 1950

2,504,976

UNITED STATES PATENT OFFICE 2,504,976

ELECTRONIC PULSE DISCRIMINATOR CIRCUIT

Donald D. Grieg, Forest Hills, N. Y., assignor to Federal Telephone and Radio Corporation, New York, N. Y., a corporation of Delaware Application November 30, 1945, Serial No. 632,053

22 Claims. (Cl. 250—27)

This invention relates to a method and system for selecting and separating pulses of a given shape from a wave or train of different shaped pulses. More particularly it deals with a means for measuring the width and shape of pulses at different amplitude levels.

It is an object of this invention to select pulses of a given shape from a train of different shaped pulses in a novel and effective manner.

Another object is to measure the shape and width of pulses at different amplitude levels in a novel and effective manner.

Another object is to select pulses which have a leading edge of a given slope from a train of different shaped pulses.

Another object is to select pulses which have a trailing edge of a given slope from a train of different shaped pulses.

Another object is to select signal modulated pulses from jamming pulses on a received train of pulses.

Another object is to select synchronizing pulses from a train of pulses carrying different modulated signals, such as in television.

Another object is to provide means for carrying out the above mentioned objects.

Still further objects will appear from time to time in the description which follows:

Generally speaking, this invention relates to a system for selecting certain pulses from a pulse wave consisting of a train of different shaped pulses, comprising means for clipping the train of pulses at different amplitude levels to produce pulse trains and comparing the pulses on the clipped pulse trains with respect to a given characteristic to produce a new pulse train consisting only of pulses corresponding to the desired selected pulses of the original pulse wave. The pulses to be selected may be time modulated or frequency modulated according to any desired signal. The comparison of the clipped pulse trains includes means for selecting therefrom pulses having a given shape, and means for combining the selected pulses to form the new pulse train of the selected pulses.

The means for selecting these pulses includes means for measuring the width, the slope of the leading edge, the slope of the trailing edge, or any two or more of these characteristics of each pulse. The number of characteristics required to select a pulse depends upon how closely the shape of the undesired pulses or pulse waves resemble the shape of the desired pulse. The selected pulses from the clipped pulse trains are separated to produce a second group of pulse trains, which are combined in such a manner that the desired selected pulses, which correspond to the desired pulses on the original pulse wave, are superimposed upon each other to produce the new pulse train. The superimposed pulses may be clipped at a suitable amplitude level to insure their separation from other pulses which are not superimposed and may appear on the new pulse wave. The original pulses selected from the original pulse wave may be separated intact by a deblocking wave produced from the new pulse train.

These, and other objects, features and uses of this invention will become more apparent upon consideration of the following detailed description of several embodiments of the invention to be read in connection with the accompanying drawings in which:

Fig. 5 is a schematic wiring diagram mostly in block of a further embodiment of the invention similar to that shown in Fig. 3;

Fig. 6 is a graph of the wave forms, which in connection with those shown in Fig. 4, is useful in explaining the operation of the system of Fig. 5;

Fig. 7 is a block wiring diagram of still another system for selecting pulses of a given shape according to this invention.

For convenience the following description is divided into four chapters: Chapter I, illustrated by Figs. 1 and 2, deals with a pulse width selector system; Chapter II—A, illustrated by Figs. 3 and 4, deals with a pulse leading edge slope selector system; Chapter II—B, illustrated by Figs. 5 and 6, deals with a pulse trailing edge slope selector system; and Chapter III, illustrated by Figs. 7 and 8, deals with a pulse width and slope, or a pulse shape selector system.

CHAPTER I

A pulse width selector system

Figure 1:
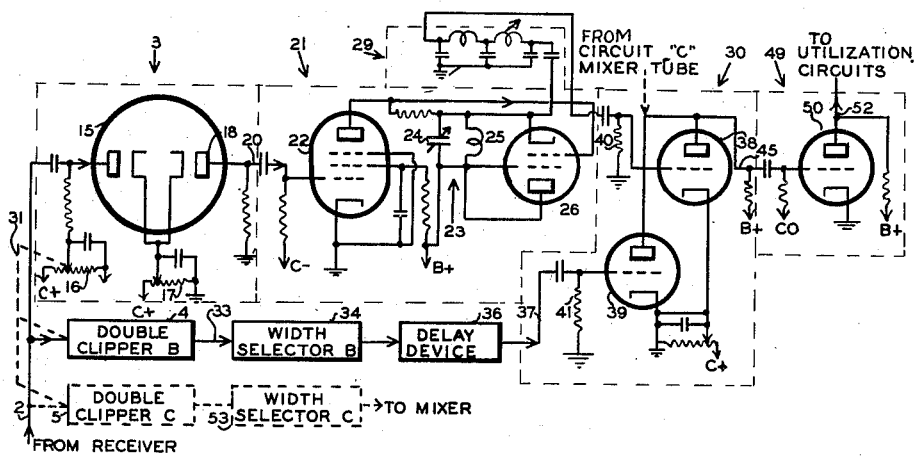
Fig. 1 is a schematic wiring diagram partially in block of a system for selecting pulses of a given shape according to one embodiment of this invention.
Figure 2:
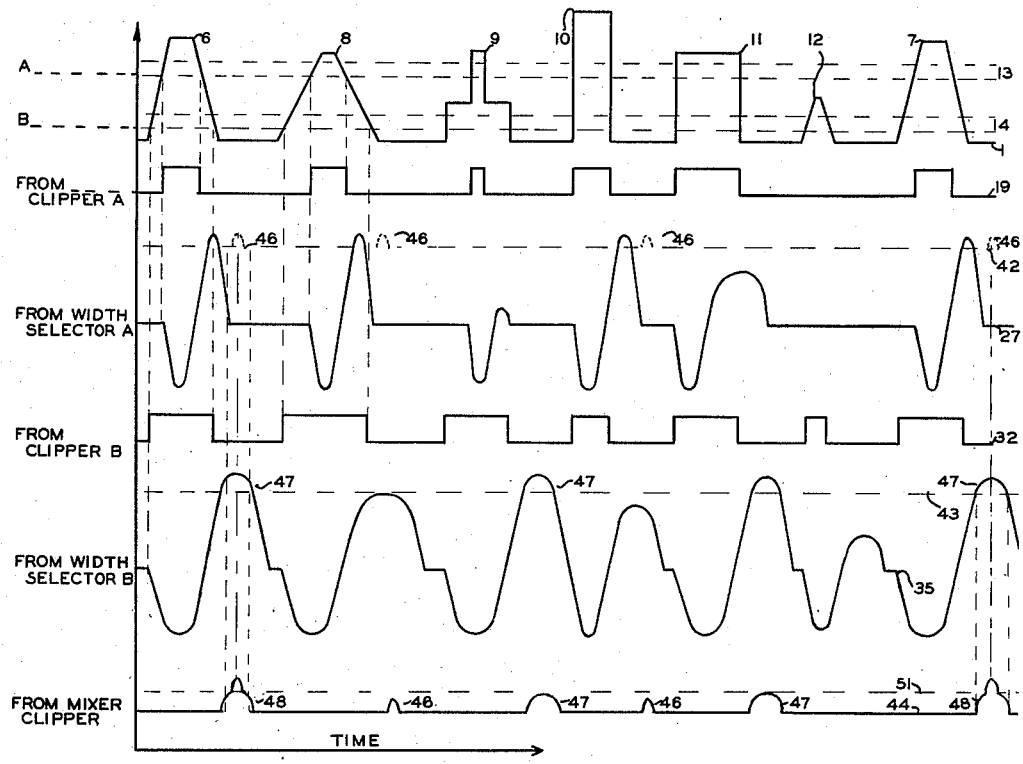
Fig. 2 is a graph of the wave forms useful in explaining the operation of the system in Fig. 1.

Referring to Figs. 1 and 2, a complex pulse wave 1 of different shaped pulses is received over line 2 coupled with double clippers 3, 4 and, if desired another, 5. On the wave 1, pulses 6 and 7 are to be selected from the other pulses 8, 9, 10, 11 and 12. The double clippers 3 and 4 clip segments A and B from the pulse wave 1 at two different amplitude levels 13 and 14, respectively. The double clipper 3 may comprise a double diode 15 and connecting circuits comprising a variable resistor 16 for determining the amplitude level 13 and a variable resistor 17 for determining the width of the segment A.

From the plate 18 of the tube 15 is withdrawn the pulse train 19 which is passed through line 20 to the width selector circuit 21 (similar to that disclosed in my joint copending application Serial No. 487,072, filed May 15, 1943, now Patent No. 2,440,278, issued April 27, 1948). This circuit comprises a tube 22 for amplifying the current in the pulse wave 19 to a given amplitude limit for operation of the tuned time-constant circuit 23, comprising a variable condenser 24 and an inductance 25. This time-constant circuit 23 is tuned to resonance in accordance with the width of the pulses to be selected.

The oscillations of current in the circuit 23 are damped by tube 26, and a maximum amplitude for the first undulation of the oscillating current is obtained for pulses having a duration equal to the time constant of the circuit 23. The resulting wave 27 is passed through a suitable variable delay device 29 (which may comprise a network of inductances and condensers to assimilate a transmission line), the purpose of which will be described later. The delayed wave is then passed into the mixer clipper 30.

Double clipper 4 for clipping segment B from the pulse wave 1 may comprise a circuit similar to that for double clipper 3, but having a different value for the resistor which corresponds to resistor 16, so as to change the clipping level from that of 13 to that of 14. If desired, the resistors for determining the amplitude of the clipping level once they are adjusted, may be ganged together through a suitable mechanical connection 31. From the double clipper 4, the pulse wave 32 is withdrawn through line 33 to the width selector B circuit 34, similar to circuit 21, but in this case having a time-constant circuit of a different value from that of circuit 23. The time-constant circuit of the width selector 34 is tuned to resonance in accordance with the width of pulses 6 and 7 at the amplitude level 14 instead of 13. From the width selector 34 is withdrawn the wave 35 which may be passed through a delay device 36, similar to 29, and thence through a line 37 to the mixer clipper 30.

The mixer clipper 30 may comprise triodes 38 and 39, the grids of which are biased through resistances 40 and 41, respectively, so that only the tops of the maximum undulations of the waves 27 and 35 above lines 42 and 43, respectively, will be passed through the tubes. These tubes 38 and 39 also prevent the pulses from the circuit of one width selector from being fed back into the circuit of another width selector. The plates of the tubes 38 and 39 are connected together and from them is withdrawn the new pulse train 44 through line 45. The delay devices 29 and 36 are provided so that the clipper desired maximas of waves 27 and 35 will be in alignment as indicated at 46 and 47, respectively, and will be in pulse train 44.

In order to further separate the desired pulses 48 on the new train 44 from the other pulses thereon, the train 44 may be passed through line 45 into a clipper or limiter 49, comprising a suitably biased tube 50, for clipping the train 44 along the line 51. The top portion of the pulses 48 then produce a pulse train corresponding only to the desired and selected pulses on the original pulse wave 1, which is withdrawn through line 52 to any desired utilization circuit.

The pulses 8, 9, 10 and 11 and 12 of pulse wave 1 may correspond in width to the desired pulses 6 and 7 at either one of the clipping levels 13 or 14. When such is the case, a corresponding pulse will be obtained on the wave 27 or 35. For example, pulses 8 and 10 have widths at level 13 identical with the desired pulses 6 and 7 and therefore produce two additional pulses 46 on the pulse train of maxima clipped from wave 27. Similarly, pulses 9 and 11 have the same width at level 14 as the desired pulses 6 and 7 and correspondingly produce two additional pulses 47 on the pulse train of maxima clipped from the wave 35. However, these additional pulses in the two pulse trains of maxima are not in alignment with each other and therefore are not superimposed when combined in the mixer clipper 30 so as to produce a pulse of the amplitude of pulses 48.

If desired, an additional two or more clipping levels, such as performed by selector "C" shown in dotted lines in Fig. 1, may also be employed to clip other segments from the pulse wave 1 which is passed through a width selector 53, then to another mixer tube (not shown) similar to 38 and 39 and coupled to the line 45.

CHAPTER II—A

A pulse leading edge slope selector system

Figure 4:
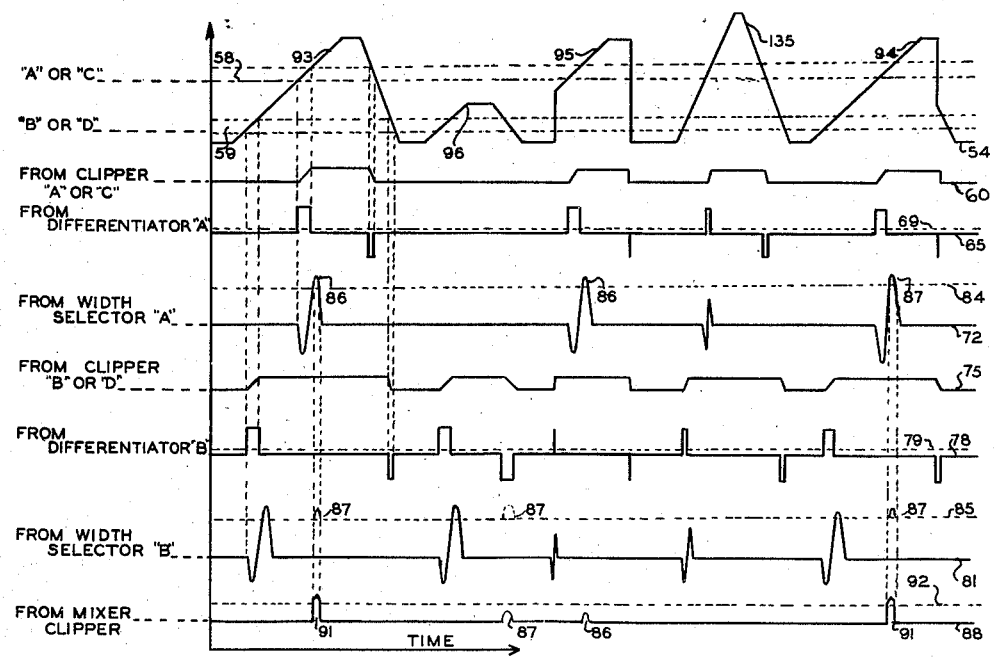
Fig. 4 is a graph of wave forms useful in explaining the operation of the system of Fig. 3.
Figure 3:
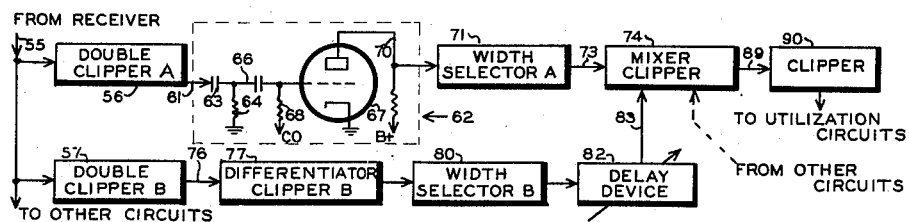
Fig. 3 is a schematic wiring diagram mostly in block of a system for selecting pulses of a given shape according to another embodiment of this invention.

A pulse having a leading edge of a given shape may be selected from a train of different shaped pulses by the system shown in Figs. 3 and 4. In this system, the original pulse wave 54 is coupled through line 55 to the double clippers 56 and 57 which clip segments A and B from wave 54 at the different amplitude levels 58 and 59 respectively. Clippers 56 and 57 are similar to tube clippers 3 and 4 shown in Fig. 1.

The pulse wave 60, Fig. 4, is withdrawn from double clipper 56 through line 61 and passed into the differentiator clipper 62. The differentiator circuit of the differentiator clipper 62 consists of a condenser 63 and resistor 64 from which is withdrawn a differentiated pulse train 65 through line 66. Train 65 is passed to the clipper tube 67, biased through resistance 68 to clip the positive pulses from the wave 65 along the line 69. The resulting positive pulse train is withdrawn through line 70 into a width selector circuit 71 (similar to the width selector circuit 21 shown in Fig. 1). From width selector 71 is withdrawn the wave 72 which is then passed through line 73 to the mixer clipper 74 (similar to mixer clipper 30 shown in Fig. 1).

The segment B clipped at level 59, produces the wave 75 which is withdrawn from double clipper 57 through line 76 to a differentiator clipper 77 (similar to differentiator clipper 62) in which is produced the differentiated wave 78, from which the positive pulses are clipped along the line 79. These positive pulses are passed to a width selector 80 (in this case identical to width selector 71) from which is withdrawn wave 81 which may be delayed in a variable delay device 82 in order to align its maximum undulations with the maximum undulations on the wave 72. If desired, the variable delaying device 82 may be inserted before the width selector 80 instead of after it. This delayed wave 81 is passed through line 83 into the mixer clipper 74.

In the mixer clipper 74 the waves 72 and 81 are clipped at levels 84 and 85 to produce trains of pulses 86 and 87, respectively. These pulse trains are combined to produce the new pulse train 88 which is withdrawn through line 89 to the clipper 90 (similar to clipper 49 in Fig. 1). The clipper 90 clips the tops of the desired superimposed pulses 91 along the line 92 to produce a train of pulses corresponding only to the desired pulses 93 and 94 of the wave 54.

Differentiation of the pulses on trains 60 or 75 produce amplitudes and widths corresponding to the slope of the edges of the pulses differentiated. The less the slope, the greater the width and the less the amplitude of the differentiated pulse. Accordingly, the resulting differentiated trains 65 and 78 may be passed through a width selector or an amplitude selector, which is tuned to select those pulses having the desired characteristic corresponding to desired slope on their leading edge. Some of the pulses may have the desired slope at one clipping level, such as pulse 95 at level 58 and pulse 96 at level 59, causing additional pulses 86 and 87, respectively, on the new pulse train 88, but these additional pulses are not in alignment and are not superimposed, so they are eliminated from the final pulse train by the clipper 90.

CHAPTER II—B

Pulse trailing edge slope selector system

Similar to the method shown in Chapter II—A above, the slope of trailing edges of a train of different shaped pulses may be measured. The system for carrying out this operation is substantially similar to that disclosed in Fig. 3, except in place of the differentiator clipper 62, a differentiator phase inverter clipper is used. Referring now to Figs. 5, 6 and to part of Fig. 4, the complex pulse wave 54 is coupled by line 97 to the double clippers 98 and 99 (identical with the double clippers 56 and 57 of Fig. 3) to clip segments C and D therefrom and produce the pulse trains 60 and 75, respectively.

The pulse train 60 is passed through line 100 to the differentiator phase inverter clipper circuit 101 including a differentiator (consisting of condenser 102 and resistor 103) and a phase inverter tube 104, from the plate of which is withdrawn the inverted differentiated wave 105 (shown in Fig. 6). This differentiated wave 105 is the inverse of wave 65 shown in Fig. 4. Wave 105 is then passed through line 106 to the clipper tube 107, biased through resistor 108 sufficiently to clip the positive pulses from wave train 105 along the line 109. These positive pulses are then passed through line 110 to a width selector C circuit 111, similar to a width selector 21 or 71 mentioned above. The wave 112 is withdrawn from the width selector 111 and may be passed through line 113 to a suitable delay device 114, and thence through line 115 through the mixer clipper 116, similar to mixer clipper 74.

Pulse train 75 corresponding to segment D is passed from double clipper 99 through line 117 into a differentiator phase inverter clipper circuit 118 (similar to circuit 101) in which is produced the inverted pulse train 119, the positive pulses of which are clipped along line 120 and passed through line 121 into a width selector 122 (similar to width selector 111). The wave 123 is withdrawn from the width selector 122 and is passed to the mixer clipper 116.

The mixer clipper 116 clips the tops of the maximum amplitude pulses on waves 112 and 123 along lines 124 and 125, respectively, and combines the resulting clipped pulses 126 and 127 to produce a new pulse train 128 having superimposed pulses 129 of greater amplitude than the additional pulse 127 from wave 123. Similarly, to segregate the additional pulse 127 on wave 128 from the pulses 129, the pulse train 128 is passed through line 130 into the clipper 131 (similar to clipper 90) from which is withdrawn through line 130 only a train of the positive pulses 129 corresponding to the desired and selected pulses 93 and 135 on wave 54.

As in the system of Chapter I, other segments may be clipped from the original pulse wave 54 at other levels. Circuits for doing this would be connected to the lines 133 and 134.

In this system as in the system of Chapter II—A above, the pulse train 112 is delayed so that the desired maxima pulses may be superimposed to form the pulses 129 on the wave 128. Although the slope of the trailing edge of pulse 94 at level 59 is identical with the slope of the trailing edges of pulses 135 and 93, pulse 94 is not selected.

CHAPTER III

Pulse width and slope selector system

Figure 8:
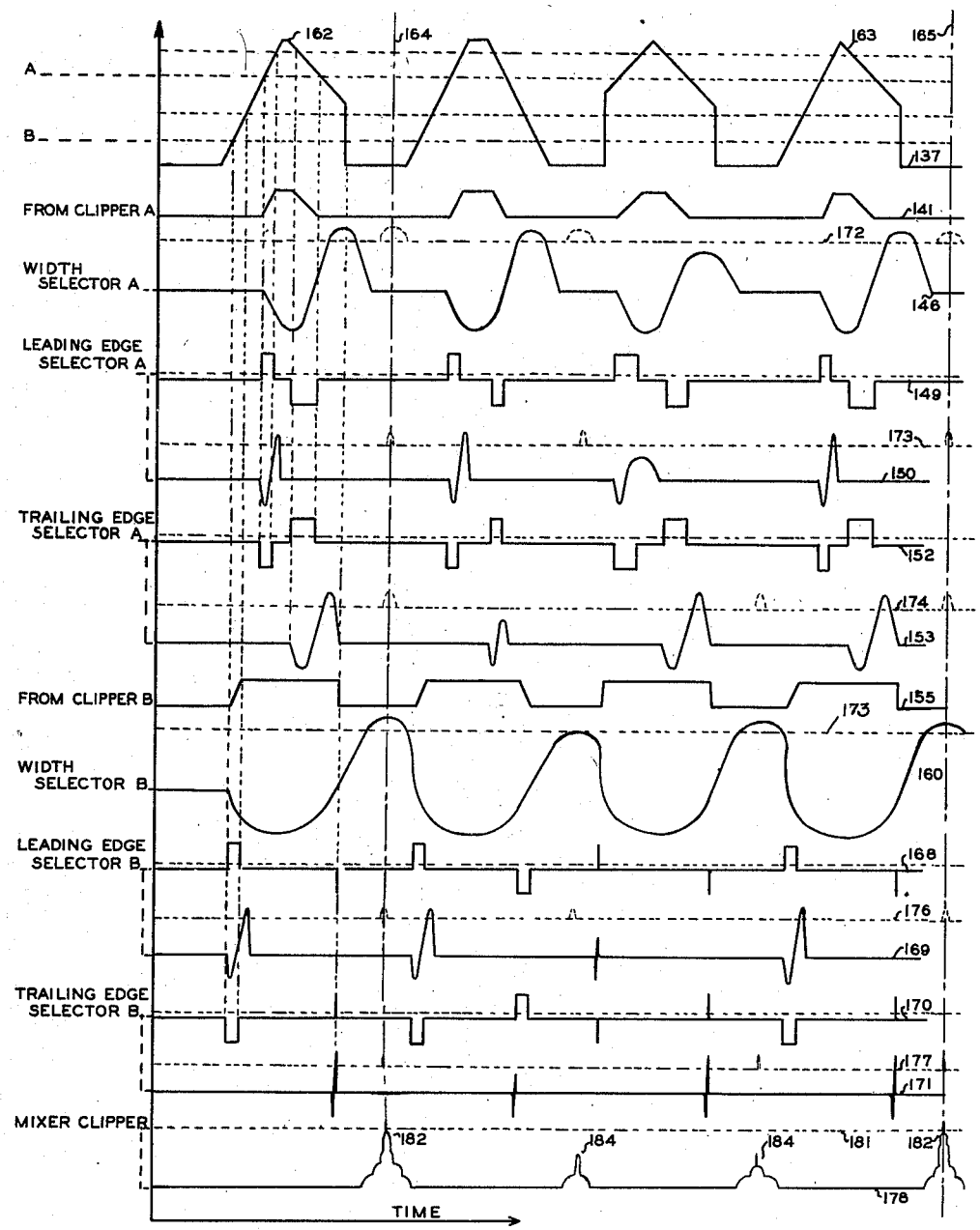
Fig. 8 is a graph of wave forms useful in explaining the operation of the system of Fig. 7.

The above characteristic selector systems may be combined for selecting pulses which have both widths and slopes similar to other pulses in a complex pulse wave. Such a combined system is disclosed in Figs. 7 and 8. The complex pulse wave 137 is passed through line 138 to double clippers 139 and 140 for respectively clipping segments A and B therefrom, as shown in Fig. 8.

The pulse train 141 is withdrawn from clipper 139 and is passed through lines 142 to the width selector 143, leading edge slope selector 144, and trailing edge slope selector 145, in parallel. The width selector 143 comprises a circuit similar to that shown in Fig. 1 including the width selector 21. From this width selector 143 is withdrawn the wave 146 which is delayed in the delay device 147 and then passed into the mixer clipper 148 (similar to the mixer clipper shown in Fig. 1). The leading edge slope selector 144 is similar to that shown in Fig. 3 consisting of the differentiator clipper 62 and the width selector 71. In these circuits of selector 144 is produced the differentiated wave 149 and from this wave is produced the width slope-selecting wave 150 which is then passed through the delay device 151 and thence into the mixer clipper 148. The trailing edge slope selector 145 is similar to that shown in Fig. 5 consisting of the differentiator phase inverter clipper 101 and the width selector 111. In these circuits of selector 145 is produced the differentiated inverted pulse train 152 and from this train is produced the wave 153 which is withdrawn to the delay device 154, and thence into the mixer clipper 148.

Similarly, the segment B clipped in double clipper 140 to produce pulse train 155, is passed through lines 156 into width selector 157, leading edge slope selector 158, and trailing edge slope selector 159. These three circuits are similar, respectively, to those mentioned for segment A and correspond with circuits 143, 144 and 145 above. From the width selector 157 is withdrawn the wave 160 which is passed directly into the mixer clipper 148. Since the bottoms of the pulses of pulse train 137 are wider at segment B than at segment A, the width selector 157 for segment B delays the desired selected pulse indications in wave 160 more than any other selector circuit and therefore a delay device is not required in the line 161 between the width selector 157 and mixer clipper 148, as is required in lines from all the other selector circuits of this system. The center of the desired pulses of wave 160, corresponding to the desired pulses 162 and 163 of the wave 137, lies along the vertical lines 164 and 165 respectively. Therefore, the delay devices 147, 151, 154, 166 and 167 are all adjusted to delay the desired maxima of the waves from their respective selectors an amount sufficient to be in alignment with the lines 164 and 165.

Pulse trains 168 and 169 are produced in the leading edge of slope selector 158, and correspondingly pulse trains 170 and 171 are produced in the selector 159.

In the mixer clipper 148, the maximas of the selected pulses on waves 146, 150, 153, 160, 169 and 171 are respectively clipped above the lines 172, 173, 174, 175, 176 and 177. The resulting desired and selected pulses are superimposed to produce the wave 178 which is withdrawn through line 179 into the clipper 180 which clips the tops of superimposed pulses of wave 178 along the line 181 so that only their positive portions 182 corresponding to the desired selected pulses 162 and 163 of wave 137, are passed through line 183 to the utilization circuits.

The graphs in Fig. 8 show that other than desired pulses on the wave 137 have characteristics which correspond to the desired pulses so that some superimposition is obtained to produce the pulses 184 shown on the new pulse train 178.

Although particular types of mixers, clippers, shape selectors, width selectors, delay devices, etc., have been shown in the circuits in the above description, other suitable mixers, clippers, shape selectors, amplitude selectors, delay devices, etc., may be used in place of those specifically shown.

While there is described above the principles of this invention in connection with several specific embodiments and particular modifications thereof, it is to be clearly understood that this description is made only by way of example and not as a limitation on the scope of this invention as defined in the accompanying claims.

I claim:

1. A method of selecting pulses of a desired shape from an original wave of different shaped pulses comprising: clipping at least two segments from said wave at different amplitude levels and producing a group of pulse trains in which the pulses of each train have a shape characteristic corresponding to the shape of the original pulses at a separate one of said amplitude levels, separately selecting from each of said trains, pulses having a shape characteristic predetermined in accordance with the shape characteristic of the original desired pulses at each said level, and combining the shape-selected pulses from one train with those shape-selected pulses of the other trains which are derived from the same original pulse, to thereby produce output pulses corresponding to the desired original pulses.

2. The method of claim 1, wherein the step of shape-selecting the pulses of said trains includes the step of width-selecting said train pulses.

3. The method of claim 1, wherein the step of shape-selecting the pulses of said trains includes the step of slope-selecting edges of said train pulses.

4. The method of claim 1, wherein the step of shape-selecting the pulses of said trains includes the steps of both width-selecting and slope-selecting said train pulses.

5. A system for selecting pulses of a desired shape from an original wave of different shaped pulses comprising: means for clipping at least two segments from said wave at different amplitude levels and producing a group of pulse trains in which the pulses of each train have a shape characteristic corresponding to the shape of the original pulses at a separate one of said amplitude levels, means for separately selecting from each of said trains, pulses having a shape characteristic predetermined in accordance with the shape characteristic of the original desired pulses at each said level, and means for combining the shape-selected pulses from one train with those shape-selected pulses of the other trains which are derived from the same original pulse, to thereby produce output pulses corresponding to the desired original pulses.

6. The system of claim 5, wherein said means for shape-selecting pulses of said trains includes means for width-selecting said pulses.

7. The system of claim 5, wherein said means for shape-selecting pulses of said trains includes means for slope-selecting the leading edges of said pulses.

8. The system of claim 5, wherein said means for shape-selecting pulses of said trains includes means for slope-selecting the trailing edges of said pulses.

9. The system of claim 5, wherein said means for shape-selecting pulses of said trains includes means for width-selecting said pulses and means for slope-selecting at least one of the edges of said pulses.

10. The system of claim 5, wherein said means for combining the shape-selected pulses includes means to delay each pulse of said one train so that the pulses thereof are in alignment with those shape-selected pulses of the other trains which are derived from the same original pulse and are superimposed when the delayed pulse trains are mixed.

11. The system of claim 5, wherein there is provided separate means for clipping said original pulse wave which are separately adjustable to change the different amplitude levels of said clipping means.

12. The system of claim 5, wherein said means for clipping said original pulse wave at different amplitude levels are variable and ganged together.

13. A system for selecting pulses of a given width from an original wave of different width pulses comprising: means for clipping said wave at at least two different amplitude levels to produce at least two groups of pulse trains, separate means for width-selecting the pulses of given widths from each of said first trains to produce a second group of pulse trains, means for combining said second group of pulse trains to produce a single new pulse train, and means for clipping said new pulse train to produce a further train of pulses consisting of pulses corresponding to the desired selected pulses from said original pulse wave.

14. A system for selecting pulses having edges of a given slope from an original wave of different shaped pulses comprising: means for clipping said original wave at at least two different amplitude levels to produce a first group of pulse trains, separate means for differentiating said first group of pulse trains to produce a second group of pulse trains, separate means for shape-selecting said second group of pulse trains to produce a third group of pulse trains, and means for combining said third group of pulse trains to produce a single new pulse train consisting of pulses corresponding to the desired selected pulses from said original pulse wave.

15. A system for selecting pulses having a given slope on a leading edge from an original wave of different shaped pulses comprising: means for clipping said original wave at at least two different amplitude levels to produce a first group of pulse trains, separate means for differentiating each of said first group of pulse trains to produce a second group of pulse trains, separate means to select the pulses of a given width on said second group of pulse trains to produce a third group of pulse trains, means for mixing said third group of pulse trains to produce a single new pulse train, and means for clipping said single new pulse train to produce a further pulse train consisting of pulses corresponding to the desired selected pulses from said original pulse train having a given slope on their leading edges.

16. A system for selecting pulses having a given slope on a trailing edge from an original wave of different shaped pulses comprising: means for clipping said wave at at least two different amplitude levels to produce a first group of pulse trains, separate means for differentiating each of said first pulse trains to produce a second group of pulse trains, separate means for phase-inverting said second group of pulse trains to produce a third group of pulse trains, separate means for shape-selecting the pulses of said third group of pulse trains to produce a fourth group of pulse trains, means for mixing said fourth group of pulse trains to produce a single new pulse train, and means for clipping said new pulse train to produce a further pulse train consisting of pulses corresponding to the desired selected pulses from said original pulse wave having a given slope on their trailing edges.

17. A system for selecting pulses of a given shape from an original wave of different shaped pulses comprising: means for clipping said wave at at least two different amplitude levels to produce a first group of pulse trains, separate means for selecting the pulses of a given width from each of said first pulse trains to produce a second group of pulse trains, separate means for differentiating said first group of pulse trains to produce a third group of pulse trains, separate means for shape-selecting the positive pulses from said third group of pulse trains to produce a fourth group of pulse trains, means for combining said second and fourth groups of pulse trains to produce a single new pulse train consisting of pulses corresponding to the desired selected pulses from said original pulse wave.

18. The system of claim 17, wherein said means for combining said first and fourth groups of pulse trains includes means for separately delaying said groups of pulse trains so that the pulses thereon, corresponding to the desired pulses of the original pulse wave, are in alignment and are superimposed when the delayed pulse trains are mixed.

19. The system of claim 17, wherein said means for combining said second and fourth groups of pulse trains includes means for mixing said second and fourth groups of pulse trains to produce said new pulse train, and includes means for clipping said new pulse train to produce a further pulse train.

20. The system of claim 17, wherein said shape-selecting means includes a width-selecting means.

21. A system for selecting pulses of a given shape from an original wave of different shaped pulses comprising: means for clipping said wave at at least two different amplitude levels to produce a first group of pulse trains, separate means for width-selecting said first group of pulse trains to produce a second group of pulse trains, separate means for first differentiating said first group of pulse trains to produce a third group of pulse trains, separate means for shape-selecting said third group of pulse trains to produce a fourth group of pulse trains, separate second differentiating means for differentiating said first group of pulse trains to produce a fifth group of pulse trains, separate means for phase-inverting said fifth group of pulse trains to produce a sixth group of pulse trains, separate means for shape-selecting said sixth group of pulse trains to prouce a seventh group of pulse trains, means for mixing said second, fourth and seventh groups of pulse trains to produce a single new pulse train consisting of pulses corresponding to the desired selected pulses from said original pulse wave.

22. The system of claim 21, wherein said means for combining said second, fourth and seventh groups of pulse trains include separate means for delaying said trains so that the pulses thereof, corresponding to the desired pulses on the original pulse wave, are in alignment and are superimposed when the pulse trains are mixed to form pulses of maximum amplitude on said single new pulse train, and includes means for clipping said maximum amplitude pulses to produce a further pulse train.

DONALD D. GRIEG.

REFERENCES CITED

The following references are of record in the file of this patent:

UNITED STATES PATENTS

| Number | Name | Date |
|---|---|---|
| 2,236,015 | Sonnetag | Mar. 25, 1941 |
| 2,408,079 | Labin | Sept. 24, 1946 |
| 2,418,127 | Labin | Apr. 1, 1947 |
| 2,429,616 | Grieg | Oct. 28, 1947 |
| 2,434,922 | Grieg | Jan. 27, 1948 |
| 2,434,937 | Labin | Jan. 27, 1948 |
| 2,440,278 | Labin | Apr. 27, 1948 |